(12) United States Patent
Van Kalken (10) Patent No.: US 12,535,049 B2
(45) Date of Patent: Jan. 27, 2026

(54) VORTEX GENERATOR TAPE FOR A WIND TURBINE BLADE AND METHOD OF MANUFACTURE AND ATTACHMENT THEREOF

(71) Applicant: LM WIND POWER A/S, Kolding (DK)

(72) Inventor: Jordy Hertel Nilsson Van Kalken, Kolding (DK)

(73) Assignee: LM WIND POWER A/S, Kolding (DK)

( * ) Notice: Subject to any disclaimer, the term of this patent is extended or adjusted under 35 U.S.C. 154(b) by 42 days.

(21) Appl. No.: 18/016,183

(22) PCT Filed: Jul. 15, 2021

(86) PCT No.: PCT/EP2021/069764
§ 371 (c)(1),
(2) Date: Jan. 13, 2023

(87) PCT Pub. No.: WO2022/013355
PCT Pub. Date: Jan. 20, 2022

(65) Prior Publication Data
US 2023/0265825 A1   Aug. 24, 2023

(30) Foreign Application Priority Data
Jul. 17, 2020   (GB) ..................................... 2011064

(51) Int. Cl.
*F03D 1/06* (2006.01)
(52) U.S. Cl.
CPC ........ *F03D 1/0633* (2013.01); *F05B 2230/90* (2013.01); *F05B 2240/305* (2020.08)

(58) Field of Classification Search
CPC ............. Y02E 10/72; F05B 2240/3062; F05B 2240/122; F05B 2250/61; F05B 2240/21;
(Continued)

(56) References Cited

U.S. PATENT DOCUMENTS 2,772,774 A * 12/1956 Rabuse .................. B65H 75/10
242/610.6
5,361,828 A * 11/1994 Lee .......................... F15D 1/12
165/109.1
(Continued)

FOREIGN PATENT DOCUMENTS

| AU | 2013224674 A1 | 9/2013 |
| CN | 209025790 U | 6/2019 |

(Continued)

OTHER PUBLICATIONS

Śmietańska, Joanna. "Spiral Length Calculator." Omni Calculator, Jun. 29, 2024, https://www.omnicalculator.com/math/spiral-length . (Year: 2025).*

*Primary Examiner* — Eric J Zamora Alvarez
(74) *Attorney, Agent, or Firm* — Nath, Goldberg & Meyer; Jerald L. Meyer (57) ABSTRACT

A vortex generator tape for installation on an outer surface of a wind turbine blade, the vortex generator comprising an elongate base part comprising an inner side configured for being adhered to the outer surface of the wind turbine blade, and an outer side arranged opposite to the inner side; and a plurality of protrusions each for generating vortices during the operation of the wind turbine blade, wherein each protrusion protrudes from the outer side of the base part and is spaced apart from every other protrusion along the base part; wherein the plurality of protrusions is formed integrally with the base part.

17 Claims, 5 Drawing Sheets

(58) Field of Classification Search
CPC ............ F05B 2240/303; F05B 2230/90; F05B 2240/305; F03D 1/0675; F03D 1/0633; F03D 1/0608; F03D 1/0641; F01D 5/145; F05D 2250/21; F05D 2250/22; F05D 2250/24; F05D 2250/711; F05D 2250/712; Y02P 70/50
See application file for complete search history.

(56) References Cited

U.S. PATENT DOCUMENTS

| | | | | |
|---|---|---|---|---|
| 5,538,394 | A * | 7/1996 | Inomata | F28F 3/02 415/115 |
| 6,578,627 | B1 * | 6/2003 | Liu | F28F 1/32 165/151 |
| 7,699,583 | B2 * | 4/2010 | Cunha | F01D 5/186 415/115 |
| 8,162,590 | B2 * | 4/2012 | Haag | F03D 1/0675 416/241 A |
| 8,678,746 | B2 * | 3/2014 | Haag | F03D 7/0224 415/908 |
| 9,133,816 | B2 * | 9/2015 | Jensen | F03D 1/0675 |
| 9,494,132 | B2 * | 11/2016 | Riddell | F03D 13/10 |
| 9,556,849 | B2 * | 1/2017 | Riddell | F03D 1/0633 |
| 9,574,544 | B2 * | 2/2017 | Tobin | F03D 1/0675 |
| 9,624,782 | B2 * | 4/2017 | Booth | F01D 5/30 |
| 9,718,992 | B2 * | 8/2017 | Traser | C09J 7/20 |
| 9,869,297 | B2 * | 1/2018 | Tobin | F03D 13/10 |
| 10,087,912 | B2 * | 10/2018 | Tobin | F03D 13/10 |
| 10,465,652 | B2 * | 11/2019 | Wetzel | F03D 1/0675 |
| 10,982,647 | B2 * | 4/2021 | Fukami | F03D 1/0691 |
| 2012/0189444 | A1 | 7/2012 | Haag | |
| 2013/0280073 | A1 * | 10/2013 | Erichsen | F03D 80/30 416/146 R |
| 2014/0154089 | A1 | 6/2014 | Traser et al. | |
| 2016/0222941 | A1 * | 8/2016 | Tobin | F03D 1/0675 |
| 2016/0327021 | A1 | 11/2016 | Tobin et al. | |
| 2017/0248116 | A1 * | 8/2017 | Fukami | F03D 13/10 |
| 2018/0106237 | A1 | 4/2018 | Tobin et al. | |
| 2019/0120205 | A1 * | 4/2019 | Harada | F03D 1/0641 |
| 2019/0226446 | A1 * | 7/2019 | Fukami | F03D 1/0633 |
| 2020/0207486 | A1 * | 7/2020 | Correa Escobar | B64F 1/26 |

FOREIGN PATENT DOCUMENTS

| | | |
|---|---|---|
| CN | 110107463 A | 8/2019 |
| EP | 2129908 B1 | 12/2010 |
| EP | 2799709 B1 | 9/2016 |
| WO | 00/15961 A1 | 3/2000 |
| WO | 2012/055418 A1 | 5/2012 |
| WO | 2013/060493 A1 | 5/2013 |

* cited by examiner

VORTEX GENERATOR TAPE FOR A WIND TURBINE BLADE AND METHOD OF MANUFACTURE AND ATTACHMENT THEREOF

This is a National Phase Application filed under 35 U.S.C. 371 as a national stage of PCT/EP2021/069764, filed Jul. 15, 2021, an application claiming the benefit of Great Britain Application No. 2011064.9, filed Jul. 17, 2020, the content of each of which is hereby incorporated by reference in its entirety.

TECHNICAL FIELD

The present disclosure relates to a vortex generator tape for a wind turbine blade, a method for manufacturing a vortex generator tape, and a method for attaching a vortex generator tape.

BACKGROUND

Vortex generators for wind turbine blades are well-known devices adhered to the finished blade surface to modify the surface airflow during operation of the wind turbine thereby optimising the aerodynamic performance of the blade. WO 00/15961 A1 discloses a wind turbine blade provided with a plurality of vortex generators.

For optimum performance, the vortex generators typically vary in height from root to tip of the wind turbine blade, wherein the vortex generators are shallowest at the tip of the wind turbine blade. These shallow vortex generators can be cumbersome to install at the blade tip. Typically, comparatively small dimensions are required towards the tip region of the blade, making it difficult to use known vortex generators in a limited space for arranging the same. Simply reducing the dimensions of known vortex generators can also be rather challenging in terms of reproducible and exact manufacturing and correct installation of smaller elements on the wind turbine blade surface.

On this background, it may be seen as an object of the present disclosure to provide a vortex generator arrangement for a wind turbine blade, a method for manufacturing a vortex generator arrangement, and a method for attaching a vortex generator arrangement, which at least alleviate some of the described drawbacks, and which are cost-effective, easy to install and reproducibly manufacturable.

The present inventors have found that one or more of these objects may be met by aspects of the present disclosure as described in the following.

SUMMARY

A first aspect of this disclosure relates to a vortex generator tape for installation on an outer surface of a wind turbine blade, the vortex generator comprising:
- an elongate base part comprising an inner side configured for being adhered to the outer surface of the wind turbine blade, and an outer side arranged opposite to the inner side; and
- a plurality of protrusions each for generating vortices during the operation of the wind turbine blade, wherein each protrusion protrudes from the outer side of the base part and preferably is spaced apart from every other protrusion along the base part;

wherein the plurality of protrusions is formed integrally with the base part.

Providing protrusions for generating vortices during operation as an integral part of a vortex generator tape may advantageously allow the installer to attach a desired number of the vortex generators directly to the wind turbine blade in a single operation by cutting the tape to the desired length and adhering the tape directly to the wind turbine blade. This contrasts with installation of conventional vortex generators which is typically time-consuming by requiring the installer to successively install individual vortex generators or fixed strips of vortex generators until the desired number of vortex generators is installed. Additionally, such a vortex generator tape is advantageous for retrofitting onto a wind turbine blade to boost performance even if just for testing purposes.

Moreover, any additional installation means or mounting means, such as mounting bars, required to install conventional vortex generators can be omitted by using such a vortex generator tape. This especially advantageous when installing on site, in particular offshore installations as access to the blades are limited.

Further, such a vortex generator tape is especially advantageous when installing short protrusions near the tip of the blade as the short conventional vortex generators may be cumbersome to handle and install.

Another advantage may be lower production costs and high reproducibility as the integrally formed vortex generator tape can more readily be mass produced when compared to individual vortex generators.

As used herein, the term "integrally formed" means that a first part is formed in an integral connection with a second part, as opposed to, for example, attaching or gluing the two parts together, and may not be intended to be detached from each other. An example of such integral formation is an additive manufacturing of the protrusions on the base part so that the protrusions are integrated into the base part without further steps of attaching the protrusions to the base part. In contrast, two parts adhered together or otherwise fastened after the separate formation of the two elements are not considered as integrally formed.

The vortex generator tape is preferably arranged within the tip region of the blade. The tip region may be defined as a region of the blade extending up to 30% of the blade length from the tip end, preferably up to 20%, more preferably 10%, or even more preferably 5%.

Additionally or alternatively, the base part may be a base strip preferably being substantially flat and/or configured for being coiled up in a roll. The outer side of the base part may preferably surround each protrusion. The outer side of the base part may be substantially flat.

Additionally or alternatively, the protrusions may be spaced apart in multiple rows or preferably in a single row.

Additionally or alternatively, the plurality of protrusions and the base part may be formed of the same material, preferably a polymer material, such as silicone, preferably flexible silicone.

In a preferred embodiment, the plurality of protrusions and the base part are formed from a single mass of material. Thus, by avoiding subsequently formed glue joints and bonding interfaces, the risk of inadvertent detachment or incorrect spatial placement of the vortex generators relative to the base part is effectively minimised.

Additionally or alternatively, the vortex generator tape may comprise a supply state and an uncoiled state, and the base part may be flexible so that the base part is coiled up in a roll in the supply state, and so that the base part is uncoiled and substantially flat in the uncoiled state, wherein the vortex generator tape may be configured for being installed on the outer surface of the wind turbine blade when in the uncoiled state.

This may be an advantage as the installer can carry a large number of vortex generators and easily cut the tape to the desired length to install a desired number of vortex generators.

Additionally or alternatively, the base part, preferably the entire vortex generator tape, may comprise or consist essentially of a material with an elasticity modulus (also known as Young's modulus) of less than 100 GPa, preferably less than 10 GPa, or more preferably less than 5 GPa. Alternatively, the elasticity modulus may be in the range of 0.01-100 GPa, preferably 0.1-10 GPa, or more preferably in the range of 0.5-5 GPa. Such values make it increasingly easier to shift the tape between the supply and uncoiled states.

Additionally or alternatively, the base part of the vortex generator tape may in the supply state be coiled up around an inner diameter, optionally a roll core. the inner diameter of the base part of the vortex generator tape in the supply state may be less than 1 metre, preferably less than 50 cm, more preferably less than 20 cm, or even more preferably less than 10 cm. Additionally, the vortex generator tape may comprise a roll core in the supply state and the base part may be coiled up around the roll core in the supply state. The roll core may be made of paperboard.

In a preferred embodiment, the thickness of the base part is between 0.01 and 10 mm, more preferably between 0.1 and 10 mm, even more preferably between 0.1 and 1 mm. This will typically allow for an efficient coiling to provide the tape in the supply state.

Additionally or alternatively, the vortex generator tape may comprise an adhesive layer on the inner side of the base part preferably configured for adhering to the outer surface of the wind turbine blade, and wherein the outer side of the base part is preferably non-adhesive and preferably aerodynamically smooth.

Additionally or alternatively, each protrusion may have a maximum protrusion height, the maximum protrusion height of each protrusion may be between 0.1 mm and 20 mm, preferably between 0.5 mm and 15 mm, more preferably between 1 mm and 10 mm, or even more preferably between 2 mm and 5 mm.

Additionally or alternatively, each protrusion of the plurality of protrusions may have substantially equal maximum protrusion height.

The maximum protrusion height may be measured in a direction extending outwardly from the outer side of the base part, preferably perpendicular to the outer side of the base part.

Such short protrusions may especially be advantageous for installation in the tip region, and the tape may provide an easy and efficient way of installing these vortex generators.

Additionally or alternatively, each protrusion may have a protrusion thickness, such as a fin thickness, wherein the protrusion thickness of each protrusion may be less than 5 mm, preferably less than 1 mm.

Such a tape is especially advantageous for providing the thin vortex generators required for the tip region of the wind turbine blade.

The protrusion thickness may be measured in a direction perpendicular to a major longitudinal extent of each protrusion and/or perpendicular to the protrusion height direction.

Additionally or alternatively, the base part has a longitudinal extent, the longitudinal extent may be at least 1 metre, preferably at least 2 metres, or more preferably at least 3 metres. The protrusions may be preferably spaced apart along the longitudinal extent.

Additionally or alternatively, the plurality of protrusions may comprise one or more protrusion pairs, such as fin pairs, wherein each protrusion pair comprising a left protrusion and a right protrusion having different shapes and being mirror symmetrical shape with respect to each other.

Additionally or alternatively, the vortex generator tape may comprise at least two protrusions, preferably at least four protrusions, more preferably at least eight protrusions, or even more preferably at least sixteen protrusions.

An increasingly large number of protrusions may allow the installer to easily choose the number of protrusions to be installed as the tape can be cut to the desired length and then installed.

Additionally or alternatively, at least the plurality of protrusions of the vortex generator tape, preferably also the base part, may be obtained by additive manufacturing, such as 3D-printing. This may be an easy way of obtaining such integrally formed protrusions. However, other manufacturing processes could be used.

A second aspect of this disclosure relates to a wind turbine blade comprising an outer surface and a vortex generator tape according to the first aspect adhered to the outer surface.

Additionally or alternatively, the wind turbine blade may comprise a blade root and a blade tip, the wind turbine blade may extend along a spanwise direction from the blade root through a root region and an airfoil region to a tip region with the blade tip. The wind turbine blade comprises a pressure side, a suction side and a chord line extending between a leading edge and a trailing edge. The wind turbine blade comprising a shell having the outer surface providing the aerodynamic shape of the wind turbine blade.

Additionally or alternatively, the outer surface may be a finished and/or unmodified surface of the wind turbine blade. The outer surface may define the intended airfoil profile of the wind turbine blade.

A third aspect of this disclosure relates to a method for manufacturing a vortex generator tape, which may preferably be according to the first aspect of this disclosure, for a tip of a wind turbine blade, comprising the steps of:
  providing an elongate base part comprising an inner side and an outer side opposite the inner side;
  integrally forming a plurality of protrusions on the base part so that each protrusion protrudes from the outer side of the base part and preferably so that each protrusion is spaced apart from every other protrusion along the base part; and
  applying an adhesive layer to the inner side of the base part.

Additionally or alternatively, the step of integrally forming the plurality of protrusions on the base part may be performed by additive manufacturing, such as 3D-printing.

Additionally or alternatively, the base part may be provided by an extrusion process and wherein the plurality of protrusions is integrally formed on the base part by a thermoforming process, e.g. vacuum thermoforming process.

A fourth aspect of this disclosure relates to a method for attaching a vortex generator tape to an outer surface of a wind turbine blade optionally according to the second aspect of this disclosure, the method comprising the steps of:
  providing a vortex generator tape according to the first aspect or performing a method according to the third aspect;

providing a wind turbine blade having an outer surface; and adhering the inner side of the vortex generator to the outer surface of the wind turbine blade.

Additionally or alternatively, the vortex generator tape may be provided as a coiled-up roll, preferably coiled up around a roll core, in a supply state, the method may further comprise uncoiling at least a portion of the vortex generator tape to an uncoiled state, and optionally cutting the uncoiled portion of the vortex generator tape, preferably prior to adhering the vortex generator tape to the outer surface of the wind turbine blade.

A person skilled in the art will appreciate that any one or more of the above aspects of this disclosure and embodiments thereof may be combined with any one or more of the other aspects of this disclosure and embodiments thereof.

BRIEF DESCRIPTION OF THE DRAWINGS

Embodiments of the present disclosure will be described in more detail in the following with regard to the accompanying figures. Like reference numerals refer to like elements throughout. Like elements may, thus, not be described in detail with respect to the description of each figure. The figures show one way of implementing embodiments of the present disclosure and are not to be construed as being limiting to other possible embodiments falling within the scope of the attached claim set. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

DETAILED DESCRIPTION

In the following figure description, the same reference numbers refer to the same elements and may thus not be described in relation to all figures.

Figure 1:
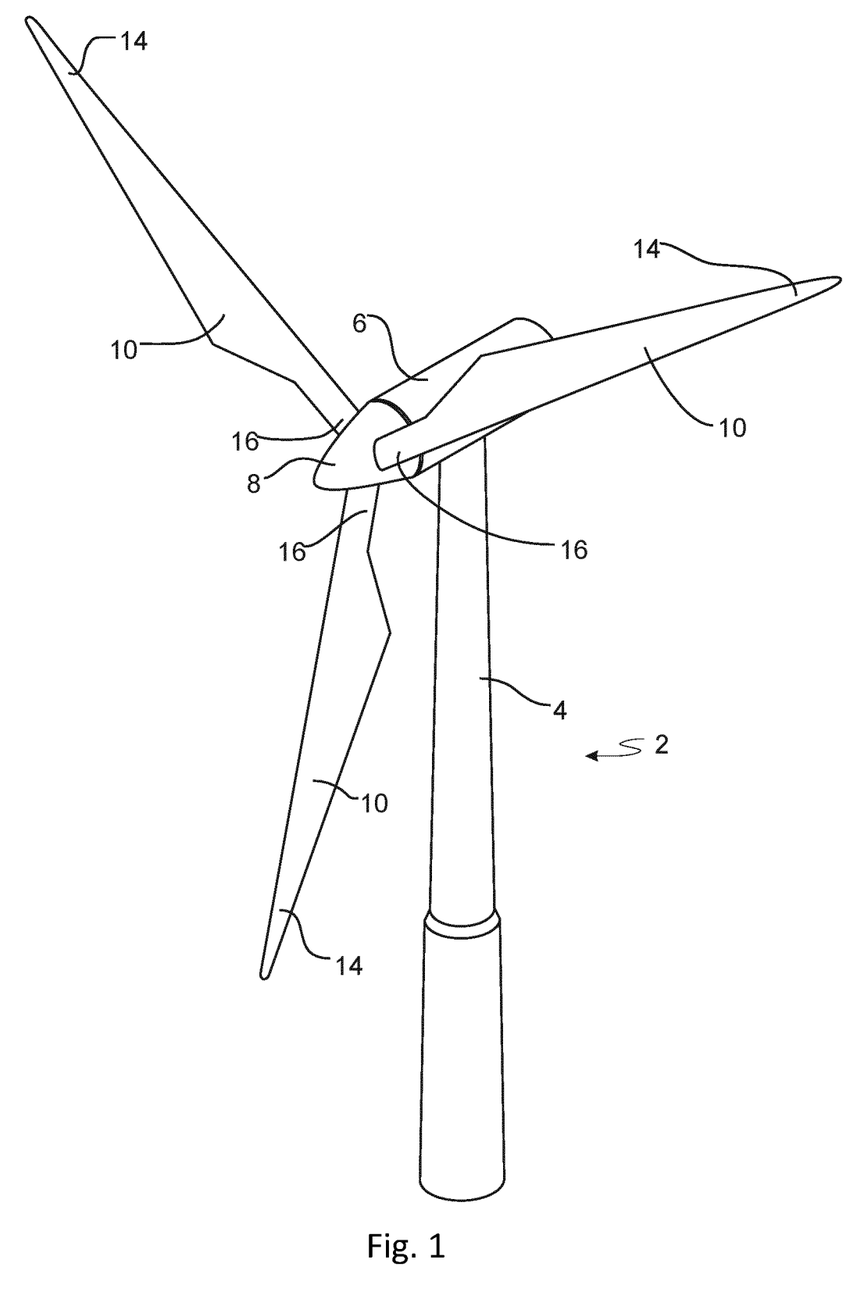
FIG. 1 is a schematic diagram illustrating a perspective view of an exemplary wind turbine.

FIG. 1 illustrates a conventional modern upwind wind turbine 2 according to the so-called "Danish concept" with a tower 4, a nacelle 6 and a rotor with a substantially horizontal rotor shaft which may include a tilt angle of a few degrees. The rotor includes a hub 8 and three blades 10 extending radially from the hub 8, each having a blade root 16 nearest the hub and a blade tip 14 furthest from the hub 8.

Figure 2:
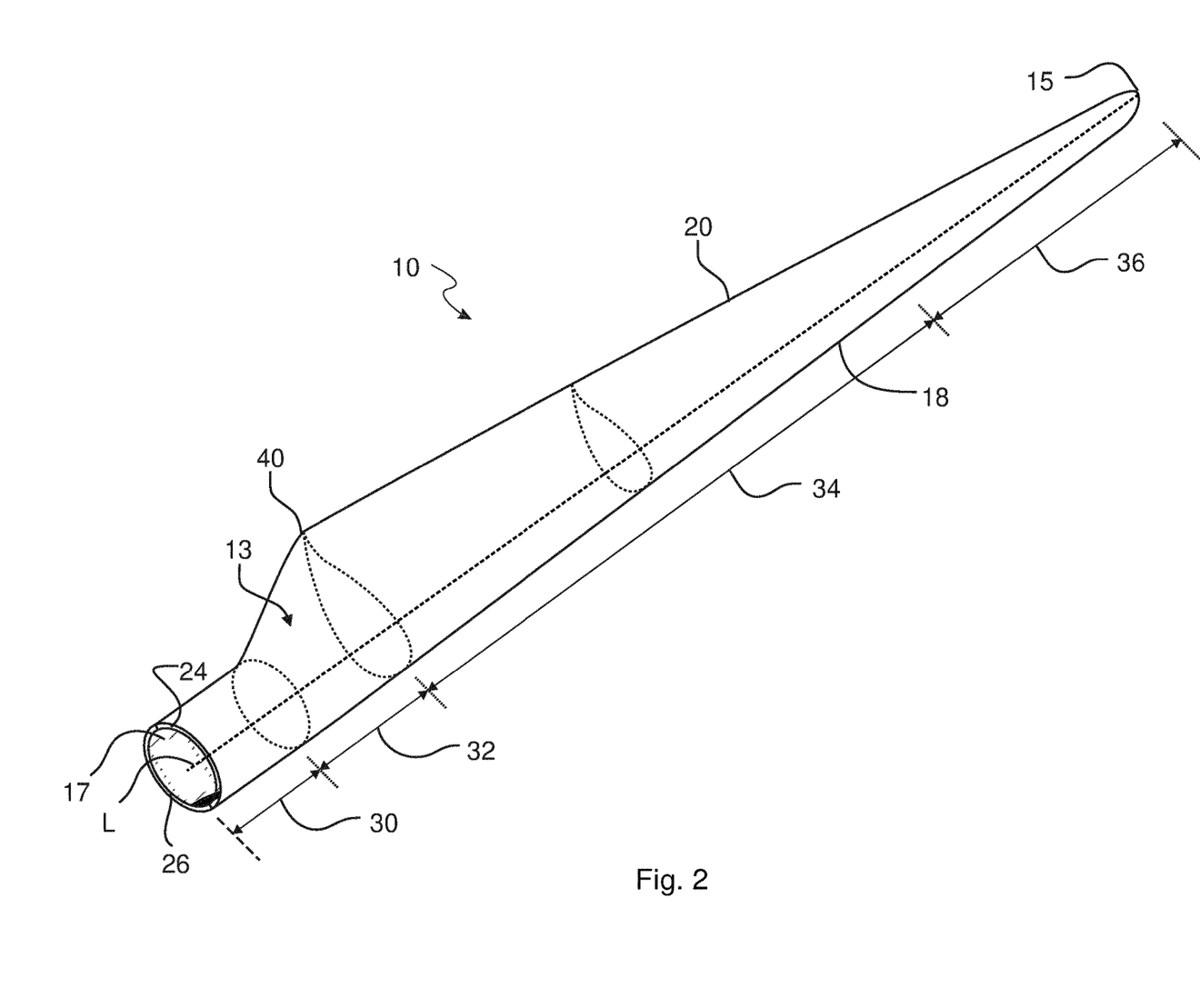
FIG. 2 is a schematic diagram illustrating a perspective view of an exemplary wind turbine blade.

FIG. 2 shows a schematic view of an exemplary wind turbine blade 10. The wind turbine blade 10 has the shape of a conventional wind turbine blade with a root end 17 and a tip end 15 and comprises a root region 30 closest to the hub, a profiled or an airfoil region 34 including a tip region 36 furthest away from the hub and a transition region 32 between the root region 30 and the airfoil region 34. The tip region 36 is defined as a region of the airfoil region extending 10% of the blade length from the tip end 15. The blade 10 comprises a leading edge 18 facing the direction of rotation of the blade 10, when the blade is mounted on the hub 8, and a trailing edge 20 facing the opposite direction of the leading edge 18.

The airfoil region 34 (also called the profiled region) has an ideal or almost ideal blade shape with respect to generating lift, whereas the root region 30 due to structural considerations has a substantially circular or elliptical cross-section, which for instance makes it easier and safer to mount the blade 10 to the hub. The diameter (or the chord) of the root region 30 may be constant along the entire root region 30. The transition region 32 has a transitional profile gradually changing from the circular or elliptical shape of the root region 30 to the airfoil profile of the airfoil region 34. The chord length of the transition region 32 typically increases with increasing distance from the hub. The airfoil region 34 has an airfoil profile with a chord extending between the leading edge 18 and the trailing edge 20 of the blade 10. The width of the chord decreases with increasing distance from the root end 17.

A shoulder 40 of the blade 10 is defined as the position, where the blade 10 has its largest chord length. The shoulder 40 is typically provided at the boundary between the transition region 32 and the airfoil region 34.

It should be noted that the chords of different sections of the blade 10 normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

The wind turbine blade 10 comprises a blade shell 13 typically comprising an outer surface 22 and two blade shell parts or half shells: a first blade shell part 24 and a second blade shell part 26, typically made of fibre-reinforced polymer. The wind turbine blade 10 may comprise additional shell parts, such as a third shell part and/or a fourth shell part. The first blade shell part 24 is a suction side or downwind blade shell part. The second blade shell part 26 is a pressure side or upwind blade shell part. The first blade shell part 24 and the second blade shell part 26 are fastened together with adhesive, such as glue, along bond lines or glue joints extending along the trailing edge 20 and the leading edge 18 of the blade 10 typically via a glue flange.

Figure 3:
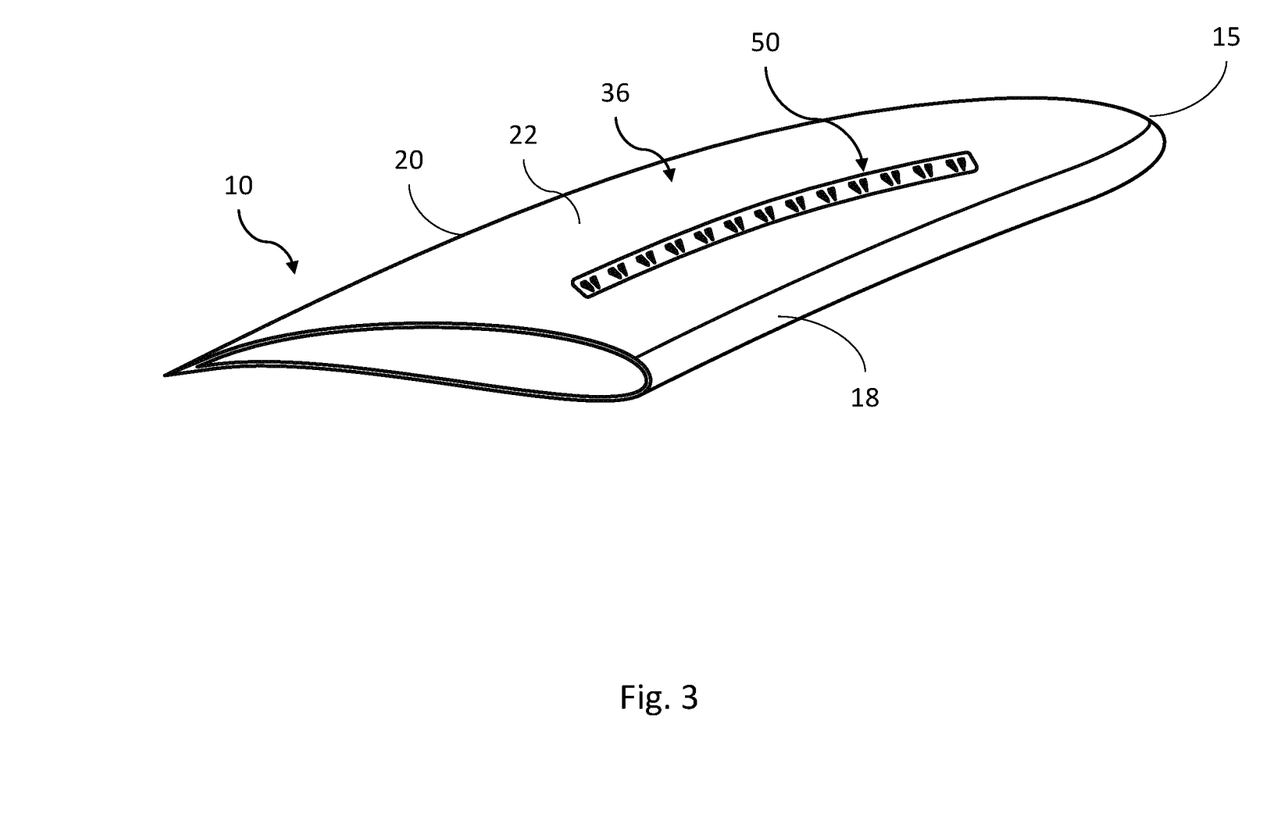
FIG. 3 is a schematic diagram illustrating a perspective view of an exemplary wind turbine blade with adhered vortex generator tape.

The performance of the tip region 36 of the blade 10 can be optimised by installing a vortex generator tape 50 on an outer surface 22 of the wind turbine blade 10 near the leading edge 18 as shown in FIG. 3.

Figure 4A:
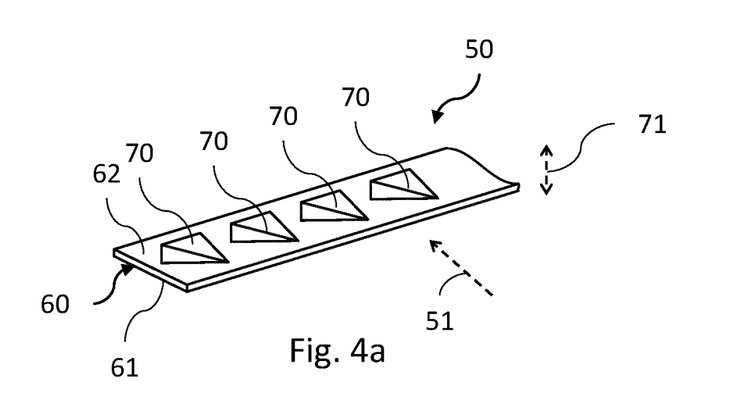
FIGS. 4a-4c are schematic diagrams illustrating a perspective view of three different embodiments of protrusions provided on a base part.
Figure 4B:
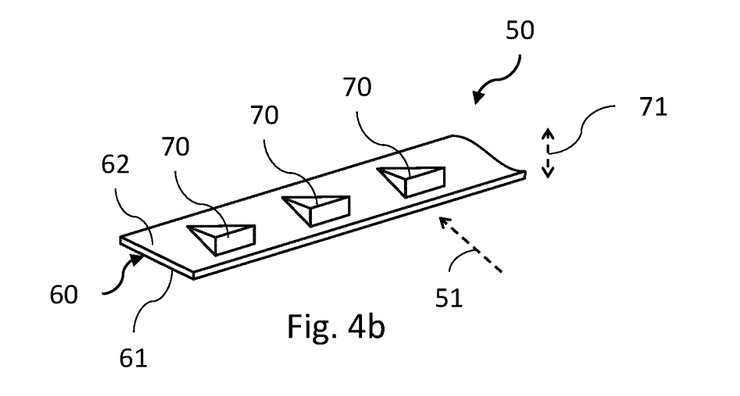
Figure 4C:
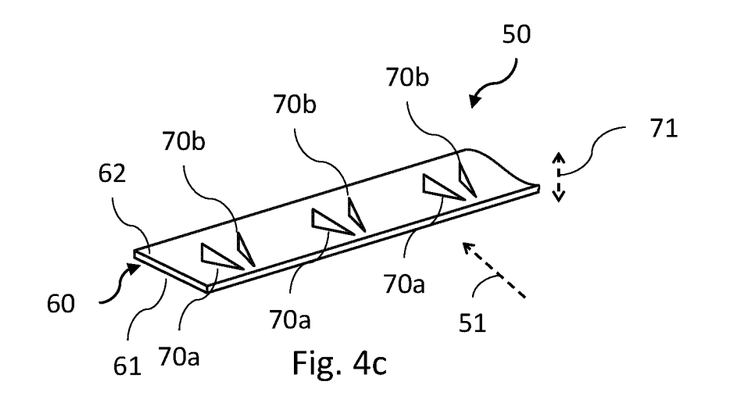

As best seen in FIGS. 4a-4c, a section of the vortex generator tape 50 is shown and comprises an elongate base part 60 comprising an inner side 61 configured for being adhered to the outer surface 22 of the wind turbine blade 10 as seen in FIG. 3 and an outer side 62 arranged opposite to the inner side 61 and being intended to face the airflow during operation of the wind turbine blade 10. The vortex generator tape 50 further comprises a plurality of protrusions 70 for generating vortices during the operation of the wind turbine blade 10. The protrusions 70 protrudes from the outer side 62 of the base part 60 and are equidistantly spaced apart from each other in a single row along the longitudinal extent of the base part 60. The plurality of protrusions 70 is formed integrally with the base part 60 by 3D-printing the protrusions 70 on the base part 60 in the same polymer material as the base part 60. Each protrusion 70 protrudes from the outer side 62 of the base part 60 in a protrusion height direction 71 perpendicular to the outer side 62 to the same maximum protrusion height of around 5 mm.

In each embodiment, the protrusions have the same shape, but the protrusion shape varies between embodiments. A first embodiment is shown in FIG. 4a, wherein the protrusions 70 are shaped as a lying oblique rectangular pyramid with the base being parallel to a first face provided on the outer side 62 of the base part. The base of the oblique rectangular pyramid is intended to face away from the incoming wind direction 51. A second embodiment is shown in FIG. 4b and is substantially the same as in the first embodiment only differing in that the base of the oblique rectangular pyramid shape is intended to face the incoming wind direction 51. Turning to FIG. 4c, a third embodiment is shown, wherein each protrusion 70 is formed of a protrusion pair including a left protrusion 70a and a right protrusion 70b shaped as flat fins angled obliquely to the incoming wind direction 51 and towards each other and further being mirror symmetrical shape with respect to each other in a plane comprising the incoming wind direction 51. In this third embodiment, the thickness of the fins 70a, 70b is less than 1 mm.

Figure 5A:
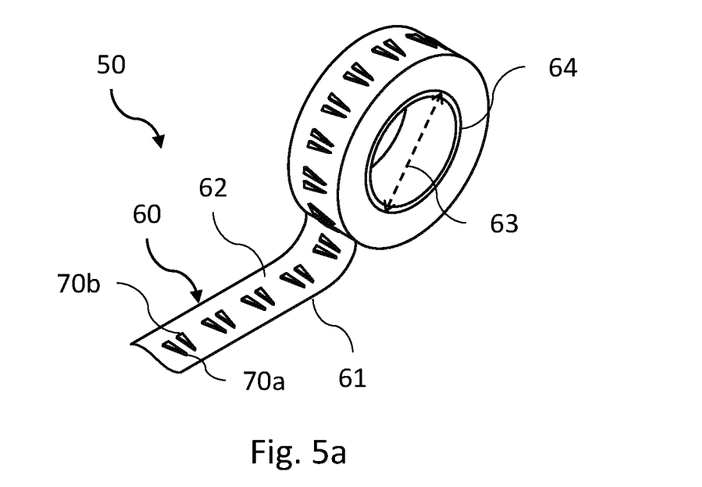
FIG. 5a is a schematic diagram illustrating a perspective view of the vortex generator tape of FIG. 4c in a supply state.

Prior to installing the vortex generator tape 50 on the wind turbine blade 10, the vortex generator tape 50 is advantageously provided in a supply state wherein the base part 60 is coiled up around a paperboard roll core 64 as is shown for the third embodiment in FIG. 5a. The other embodiments are advantageously provided in the same way. The base part 60 has an inner diameter of about 10 cm which makes the roll easy to handle for the installer.

Figure 5B:
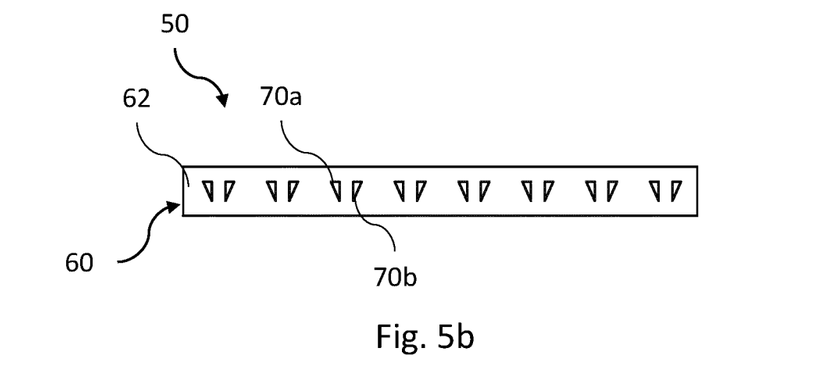
FIG. 5b is a schematic diagram illustrating a perspective view of the vortex generator tape of FIG. 4c in an uncoiled state.

The polymer material of the base part 60 is flexible enough to allow the installer to uncoil the base part 60 and bring it to an uncoiled state in which the base part is substantially flat and allows it to conform to the outer surface 22 of the blade 10 as shown in FIG. 5b.

Figure 5C:
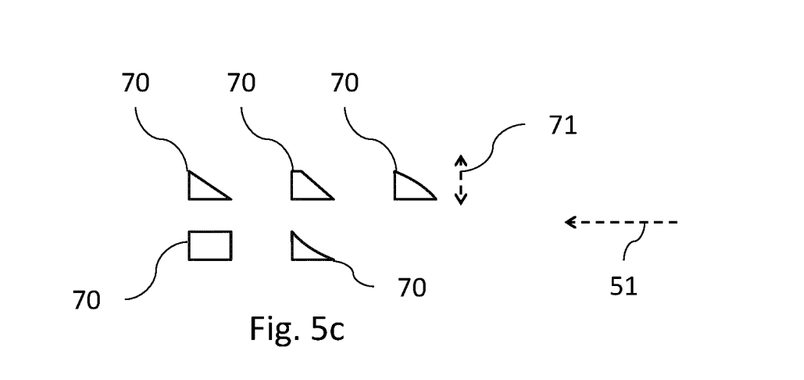
FIG. 5c is a schematic diagram illustrating a side view of five different protrusion shapes.

The protrusions may have many different shapes. FIG. 5c illustrates five different shapes shown in a side view. From top-left to bottom-right, the shapes include right-angled triangular, right-angled truncated triangular, right-angled convex-curved triangular, rectangular, and right-angled concave-curved triangular.

LIST OF REFERENCES 2 wind turbine
4 tower
6 nacelle
8 hub
10 blade
13 shell
14 blade tip
15 tip end
16 blade root
17 root end
18 leading edge
20 trailing edge
22 outer surface
24 first blade shell part
26 second blade shell part
30 root region
32 transition region
34 airfoil region
36 tip region
40 shoulder
50 vortex generator tape
51 wind direction
60 base part
61 inner side
62 outer side
63 inner diameter
64 roll core
70 protrusion
70a left protrusion
70b right protrusion
71 protrusion height direction

The invention claimed is:

1. A vortex generator tape for installation on an outer surface of a wind turbine blade, the vortex generator tape comprising:
    an elongated base part comprising an inner side configured for being adhered to the outer surface of the wind turbine blade, and an outer side arranged opposite to the inner side; and
    a plurality of protrusions for generating vortices during operation of the wind turbine blade, wherein each protrusion protrudes from the outer side of the elongated base part, wherein each of the protrusions has a first face and a second face, the first face being rectangular and extending from the outer side of the elongated base part, the second face facing away from the base part and at least partially sloping from the first face to the outer side of the elongated base part,
    wherein the plurality of protrusions is formed integrally with the elongated base part,
    wherein the vortex generator tape comprises a supply state and an uncoiled state, the elongated base part being flexible such that the elongated base part is coiled up in a roll in the supply state, and such that the elongated base part is uncoiled and flat in the uncoiled state,
    wherein the vortex generator tape is configured for being installed on the outer surface of the wind turbine blade in the uncoiled state,
    wherein the first face extends perpendicularly from the outer side of the elongated base part,
    wherein each of the protrusions has a third face and a fourth face, the third and fourth faces opposing each other and extending from the outer side of the elongated base part to the second face, and
    wherein the second face is convexly curved or concavely curved.

2. The vortex generator tape according to claim 1, wherein the plurality of protrusions and the base part are formed of a same polymer material.

3. The vortex generator tape according to claim 2, wherein the plurality of protrusions and the base part are formed from a single mass of the material.

4. The vortex generator tape according to claim 1, wherein each protrusion has a maximum protrusion height, the maximum protrusion height of each protrusion being between 0.1 mm and 20 mm.

5. The vortex generator tape according to claim 1, wherein each protrusion has a protrusion thickness, wherein the protrusion thickness of each of the protrusions is less than 5 mm.

6. The vortex generator tape according to claim 1, wherein the plurality of protrusions comprises one or more protrusion pairs, wherein the one or more protrusion pairs comprise a left protrusion and a right protrusion being mirror symmetrical shapes with respect to each other.

7. The vortex generator tape according to claim 1, wherein at least the plurality of protrusions of the vortex generator tape is obtained by additive manufacturing.

8. A wind turbine blade comprising an outer surface and the vortex generator tape according to claim 1 adhered to the outer surface.

9. A method for attaching a vortex generator tape to an outer surface of a wind turbine blade, the method comprising the steps of:
 providing the vortex generator tape according to claim 1;
 providing the wind turbine blade having the outer surface; and
 adhering the inner side of the vortex generator tape to the outer surface of the wind turbine blade.

10. The method according to claim 9, wherein the vortex generator tape is provided in the supply state, the method further comprises uncoiling at least a portion of the vortex generator tape to the uncoiled state, and cutting an uncoiled portion of the vortex generator tape prior to the step of adhering the vortex generator tape to the outer surface of the wind turbine blade.

11. The vortex generator tape according to claim 1, wherein the second face of each of the protrusions is continuously sloping from the first side to the outer side of the elongated base part, such that each of the protrusions has a right-angled triangular cross-section.

12. The vortex generator tape according to claim 1, wherein the second face of each of the protrusions comprises a first portion extending parallel to the outer side of the elongated base part and a second portion sloping from the first portion toward the outer side of the elongated base part, such that each of the protrusions has a right-angled truncated triangular cross-section.

13. The vortex generator tape according to claim 1, wherein the first face is oriented towards or away from an incoming wind direction.

14. The vortex generator tape according to claim 1, wherein the protrusion is shaped as an oblique rectangular pyramid.

15. A method for manufacturing a vortex generator tape for a tip of a wind turbine blade, comprising the steps of:
 providing an elongated base part comprising an inner side and an outer side opposite the inner side;
 integrally forming a plurality of protrusions on the elongated base part so that each of the protrusions protrudes from the outer side of the elongated base part, wherein each of the protrusions has a first face and a second face, the first face being rectangular and extending from the outer side of the elongated base part, the second face facing away from the base part and at least partially sloping from the first face to the outer side of the elongated base part, and
 applying an adhesive layer to the inner side of the elongated base part to form the vortex generator tape,
 wherein the vortex generator tape comprises a supply state and an uncoiled state, the elongated base part being flexible such that the elongated base part is coiled up in a roll in the supply state, and such that the base part is uncoiled and flat in the uncoiled state,
 wherein the vortex generator tape is configured for being installed on the wind turbine blade in the uncoiled state,
 wherein the first face extends perpendicularly from the outer side of the elongated base part,
 wherein each of the protrusions has a third face and a fourth face, the third and fourth faces opposing each other and extending from the outer side of the elongated base part to the second face, and
 wherein the second face is convexly curved or concavely curved.

16. The method according to claim 15, wherein the step of integrally forming the plurality of protrusions on the base part is performed by additive manufacturing.

17. The method according to claim 15, wherein the base part is provided by extrusion and wherein the plurality of protrusions is integrally formed on the base part by thermoforming.

\* \* \* \* \*